(12) United States Patent
Mecnika et al.

(10) Patent No.: US 12,703,320 B2
(45) Date of Patent: Aug. 11, 2026

(54) HEATABLE BELT STRAP, AND SEAT BELT SYSTEM

(71) Applicant: ZF AUTOMOTIVE GERMANY GMBH, Alfdorf (DE)

(72) Inventors: Viktorija Mecnika, Schwabisch Gmünd (DE); Martina Rausch, Remshalden (DE)

(73) Assignee: ZF AUTOMOTIVE GERMANY GMBH, Alfdorf (DE)

(*) Notice: Subject to any disclaimer, the term of this patent is extended or adjusted under 35 U.S.C. 154(b) by 175 days.

(21) Appl. No.: 18/556,109

(22) PCT Filed: Apr. 21, 2022

(86) PCT No.: PCT/EP2022/060561
§ 371 (c)(1),
(2) Date: Oct. 19, 2023

(87) PCT Pub. No.: WO2022/223698
PCT Pub. Date: Oct. 27, 2022

(65) Prior Publication Data

US 2024/0208458 A1 Jun. 27, 2024

(30) Foreign Application Priority Data

Apr. 22, 2021 (DE) ..................... 10 2021 110 180.8

(51) Int. Cl.
*B60R 22/12* (2006.01)
*D03D 1/00* (2006.01)
*D03D 15/533* (2021.01)

(52) U.S. Cl.
CPC ........... *B60R 22/12* (2013.01); *D03D 1/0005* (2013.01); *D03D 15/533* (2021.01); *D10B 2401/16* (2013.01); *D10B 2505/122* (2013.01)

(58) Field of Classification Search
CPC .... B60R 22/12; D03D 1/0005; D03D 15/533; D10B 2401/16; D10B 2505/122
See application file for complete search history.

(56) References Cited

U.S. PATENT DOCUMENTS 3,425,020 A * 1/1969 Takeo ..................... D03D 1/00 219/545
7,038,177 B2 * 5/2006 Rock ........................ D04B 1/04 219/545

(Continued)

FOREIGN PATENT DOCUMENTS

DE 102017005443 A1 2/2018
DE 202018005760 U1 1/2019

(Continued)

OTHER PUBLICATIONS

PCT Search Report for corresponding International Application Serial No. PCT/EP2022/060561, mailed Sep. 14, 2022, pp. 1-6.

*Primary Examiner* — William Kelleher
(74) *Attorney, Agent, or Firm* — Tarolli, Sundheim, Covell & Tummino LLP

(57) ABSTRACT

The invention describes a heatable webbing (12) for a seatbelt system (14) of an automotive vehicle, wherein the webbing (12) comprises plural heatable sections (24, 26, 28) each extending over different longitudinal portions of the webbing (12), wherein at least one heating conductor (18, 20, 22, 44, 46, 64, 66, 68) is associated with each heatable section (24, 26, 28) in such a manner that the heatable sections (24, 26, 28) can be heated separately from each other by appropriate activation of the individual heating conductors (18, 20, 22, 44, 46, 64, 66, 68). Moreover, the invention describes a seatbelt system (14) for an automotive vehicle comprising a heatable webbing (12).

20 Claims, 6 Drawing Sheets

(56) References Cited

U.S. PATENT DOCUMENTS

Figure 1:
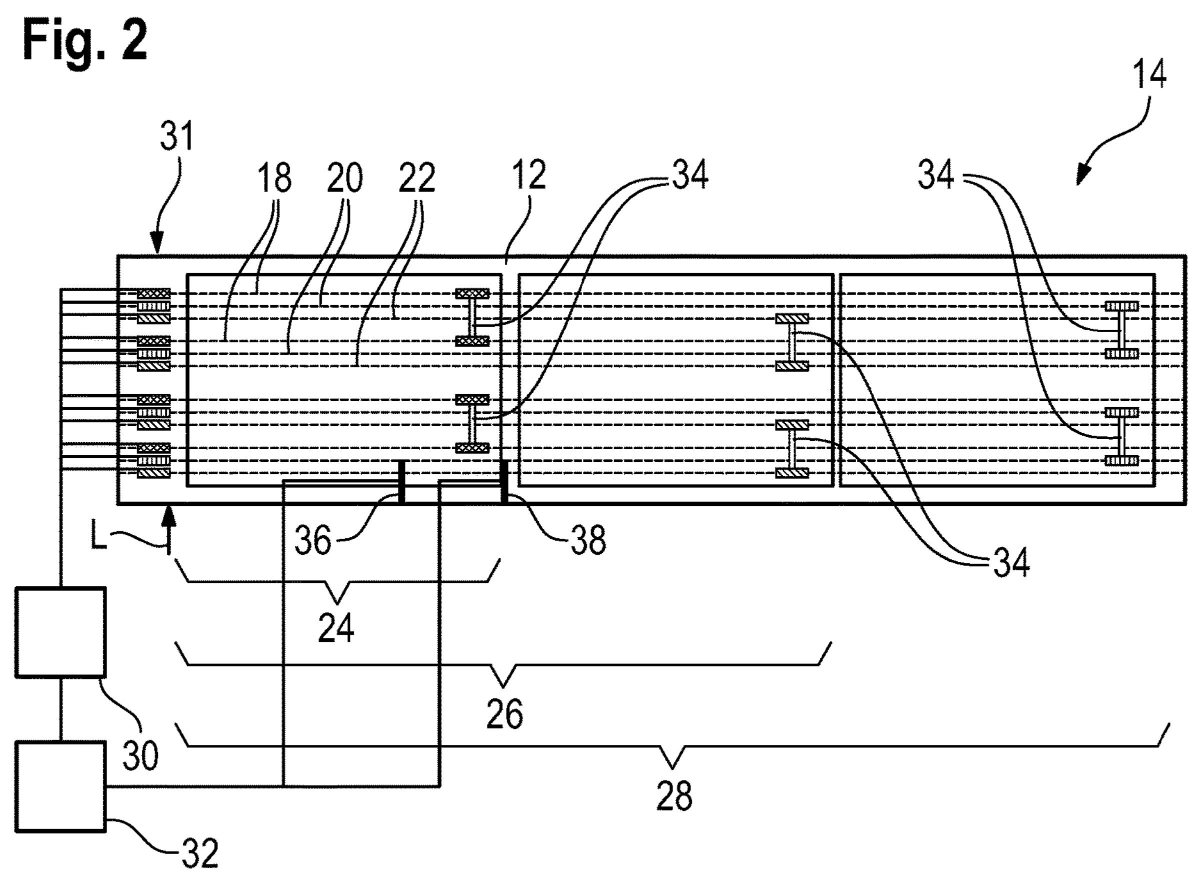

| | | | | |
|---|---|---|---|---|
| 10,143,043 | B1 * | 11/2018 | Elson | B60R 22/48 |
| 2004/0262294 | A1 * | 12/2004 | Horey | H05B 3/342 219/548 |
| 2012/0100386 | A1 * | 4/2012 | Honma | D02G 3/32 428/592 |
| 2014/0246415 | A1 * | 9/2014 | Wittkowski | H05B 3/347 219/201 |
| 2017/0009387 | A1 * | 1/2017 | Ge | D03D 1/0088 |
| 2021/0309179 | A1 * | 10/2021 | Zhang | B60H 1/00 |
| 2021/0339700 | A1 * | 11/2021 | Rausch | B60R 22/12 |
| 2022/0097581 | A1 * | 3/2022 | Henry | D04B 1/16 |
| 2023/0365097 | A1 * | 11/2023 | Rausch | B60R 22/12 |
| 2024/0217476 | A1 * | 7/2024 | Rausch | D03D 1/0005 |
| 2025/0108775 | A1 * | 4/2025 | Werner | B60R 22/12 |

FOREIGN PATENT DOCUMENTS

| | | | | |
|---|---|---|---|---|
| DE | 102017009619 | A1 | | 4/2019 |
| DE | 102018118778 | A1 | | 2/2020 |
| DE | 102018124241 | A1 | | 4/2020 |
| JP | 2008067850 | A | * | 3/2008 |
| JP | 2016141196 | A | | 8/2016 |
| WO | 2020/069998 | A1 | | 4/2020 |

* cited by examiner 10
18
20
22
16
24
26
28

12
31
18
20
22
43
40
41
43
42
43
L
36
38
43
43
43
24
26
28

12
48
46
44
50
52
L
47
36
38
24
26
28

HEATABLE BELT STRAP, AND SEAT BELT SYSTEM

RELATED APPLICATIONS

This application is a U.S. National Stage Application filed under 35 USC 371 claiming priority to Serial No. PCT/EP2022/060561, filed on 21 Apr. 2022; which claims priority from German Patent Application DE 10 2021 110 180.8, filed 22 Apr. 2021, the entireties of which are hereby incorporated herein by reference.

The invention relates to a heatable webbing for a seatbelt system of an automotive vehicle as well as to a seatbelt system comprising a heatable webbing.

A seatbelt system serves to restrain a vehicle occupant in the case of strong decelerations of the vehicle so that the vehicle occupant him-/herself decelerates as evenly as possible and he/she is prevented from contacting any objects within the vehicle such as a steering wheel or an instrument panel.

Apart from the safety aspect, the webbing may also fulfill comfort functions by the webbing having a heating function, for example.

It is a drawback of the known systems that a heatable area of the webbing has a defined length so that, independently of a vehicle occupant's body height, it is always the same area that is heated.

Therefore, it is an object of the invention to provide an optimized heatable webbing.

According to the invention, this object is achieved by a heatable webbing for a seatbelt system of an automotive vehicle, the webbing comprising plural heatable sections which extend over respective different longitudinal portions of the webbing, wherein at least one heating conductor is associated with each heatable section in such a manner that the heatable sections are heatable separately from each other by appropriate activation of the individual heating conductors.

The webbing according to the invention offers the advantage that the webbing need not be heated completely, if a vehicle occupant has a relatively short body height, for example, but that the different sections can be heated in response to a body height of a vehicle occupant.

On the one hand, this contributes to the energy efficiency of the seatbelt system. On the other hand, the belt reel is prevented from being heated, if the webbing is not completely unwound, which might cause heat accumulation.

The heatable sections extend specifically over longitudinal portions of various lengths of the webbing.

Wires, strands, conductive yarns or other conductive or semi-conductive materials can serve as heating conductors. The heating conductors are insulated which can be done by enamel insulation, for example.

Preferably, the heating conductors are configured such that they can be processed by a loom. For this purpose, e.g., a textile thread such as a polyamide or polyester thread can be wound around the heating conductors. In this way, the heating conductors can be machine-incorporated into a webbing body.

According to one embodiment, the webbing has a woven webbing body which includes warp threads extending in the longitudinal direction and weft threads extending transversely to the warp threads, the heating conductors being woven into the webbing body as warp thread or weft thread. In this way, the heating conductors can be integrated particularly easily into the webbing body already during manufacture.

Preferably at least two heating conductors extending in parallel to each other are associated with each heatable section. By the use of two heating conductors extending in parallel, a closed circuit which serves to heat the webbing can be formed in a specifically simple manner. For this purpose, one end of the heating conductors can be connected to a voltage source and at the other end thereof they can be interconnected.

The heatable sections can be arranged to overlap in the longitudinal direction. In this way, it is sufficient to heat only one of the heatable sections at a time. One area in which all heatable sections overlap is consequently always heated when the heating is active, irrespective of which of the heatable sections is activated.

Preferably, all heatable sections extend from an initial portion of the webbing, in particular wherein all heatable sections start at the same longitudinal position of the webbing. This offers the advantage that the heating conductors can be connected to a power source at the same point of the webbing. The contacting of the heating conductors is particularly simple in this way.

The heating conductors associated with one heatable section can be guided to a surface of the webbing at the beginning and/or the end of the respective heatable section. In this case, this is also referred to as a so-called float. In other words, the heating conductors are partially exposed. At the points where the heating conductors are guided to the surface, they are particularly easily accessible and, thus, can be contacted particularly easily.

The heating conductors associated with the same heatable section are preferably electrically interconnected. In this way, a circuit is established, wherein the heating conductors warm up if current flows through the circuit and, in this way, heat the webbing.

According to one embodiment, the heating conductors are woven into the webbing body as warp threads and the heating conductors are electrically interconnected by means of electrically conductive weft threads so as to close a circuit. Thus, already during manufacture of the webbing body, the electric conductors can be integrated in the same for electrically connecting the heating conductors.

Instead of using electrically conductive weft threads, the heating conductors can also be electrically interconnected by a flexible circuit board or other connecting elements.

According to another embodiment, the heating conductor can be formed by a bipolar conductor having two individual conductors insulated from each other, wherein the individual conductors are electrically interconnected in an end portion of the heating conductor. That is, in the end portion of the heating conductor the insulation is at a certain distance so that the individual conductors are interconnected. The use of a bipolar heating conductor offers the advantage that the two individual conductors can be integrated jointly into the webbing body, which facilitates manufacture of the webbing body.

In the webbing, a temperature sensor can be integrated. It can be determined by means of the temperature sensor whether it is necessary to heat the webbing. At the same time, the temperature sensor may be part of a monitoring system in order to prevent the webbing from becoming too hot.

The temperature sensor is preferably disposed in an area where the heatable sections are overlapping.

As an alternative, a temperature can also be measured by measuring a resistance of the heating conductors, as the resistance of the heating conductors is temperature-dependent.

In order to prevent the temperature of the webbing from exceeding a defined maximum temperature in the case of active heating, the heating conductors which are associated with the different heatable sections can be made of materials of different conductivity. The shorter the heatable section, the shorter also the heating conductors and the lower the resistance of the circuit comprising the heating conductors. The longer the heating conductors, the higher also the resistance. If the same material is used for all heating conductors, at equal voltage the heatable section having the larger length therefore will warm up more strongly due to the higher resistance. In order to compensate for this effect, it is conceivable to choose heating conductors having a higher electric conductivity for larger circuits than for smaller circuits.

The object is further achieved, according to the invention, by a seatbelt system for an automotive vehicle comprising a heatable webbing which is designed as above described and a power source which is connected to the heating conductors. The power source specifically is a voltage source.

The seatbelt system can moreover include a motion sensor arranged to monitor webbing extension and, thus, to detect the height of the occupant.

According to one embodiment, the seatbelt system includes a control unit. Preferably, the control unit is arranged to regulate a heating temperature. In addition, the control unit may be arranged to control the heatable sections. In other words, the control unit is arranged to determine which of the heatable sections is heated, in particular based on the webbing extension detected by the motion sensor, and what is the voltage applied to the heating conductors.

Figure 3:
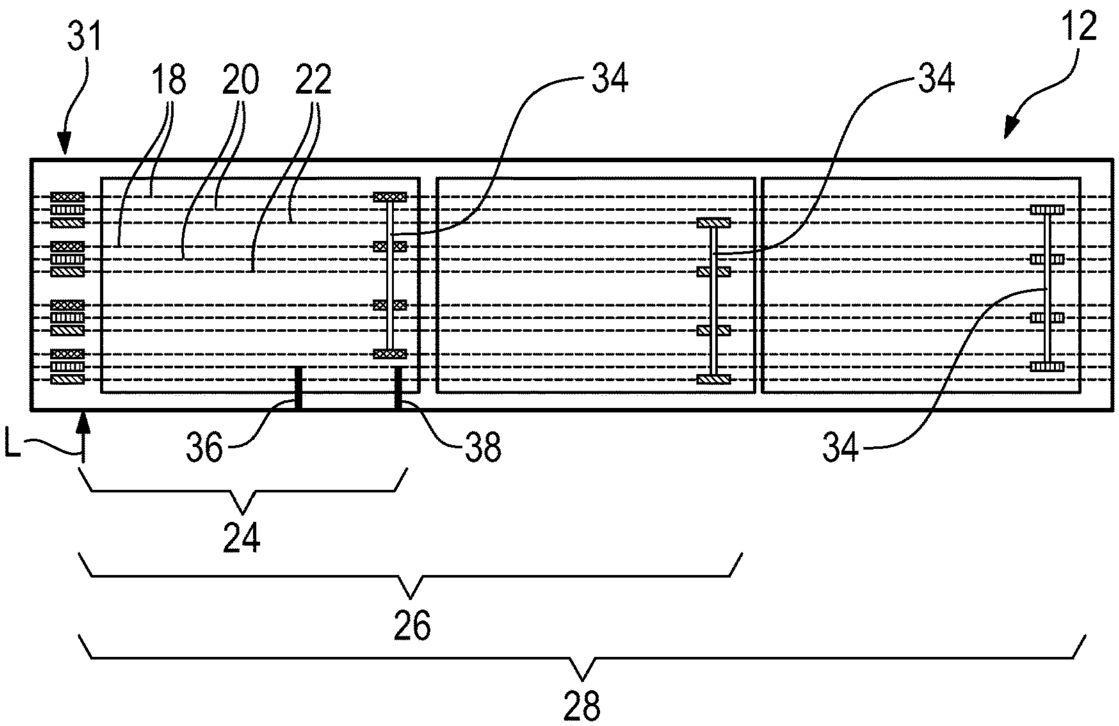
Figure 4:
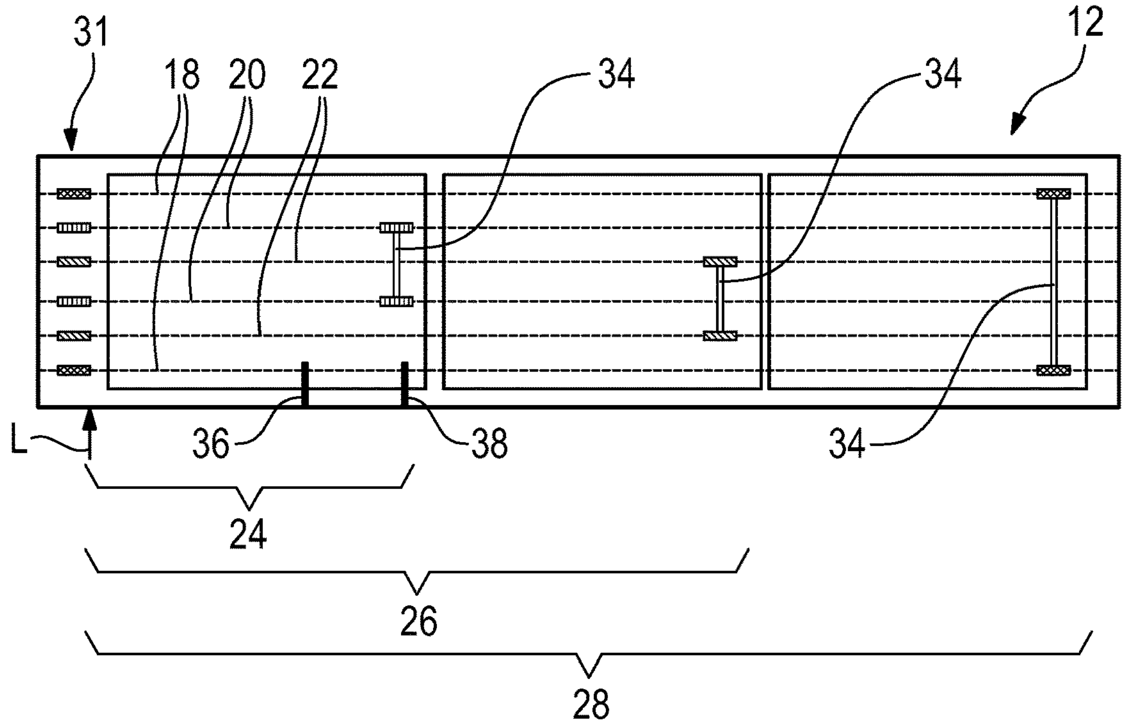
Figure 5:
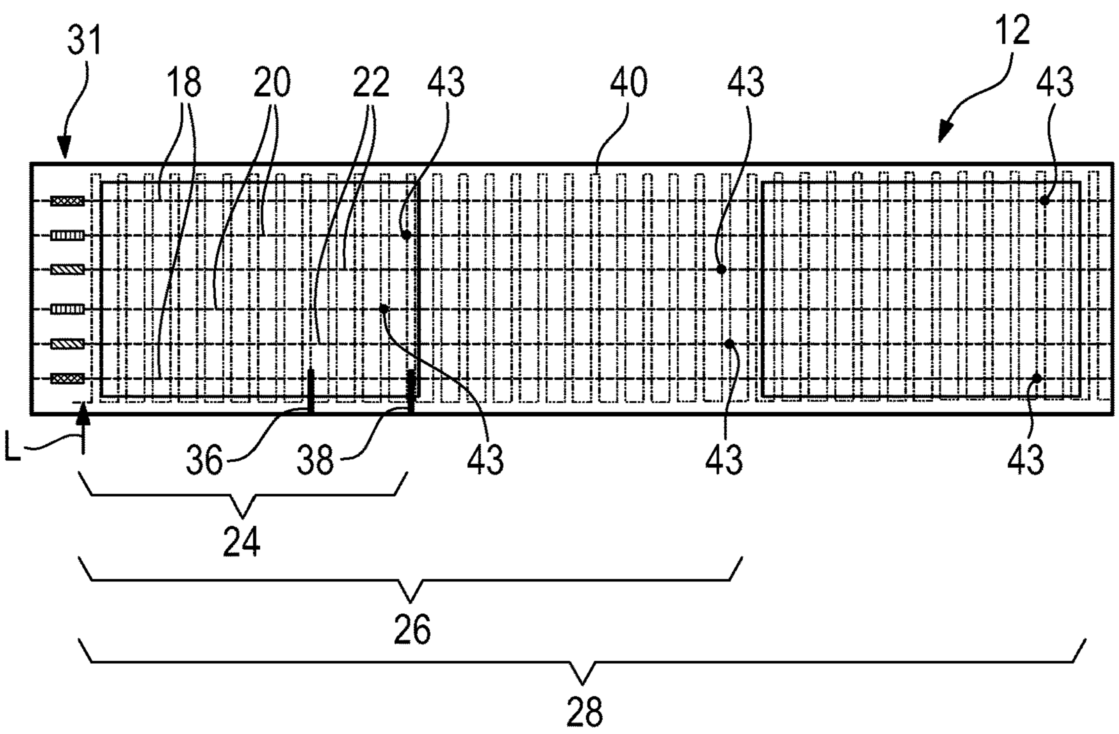
Figure 6:
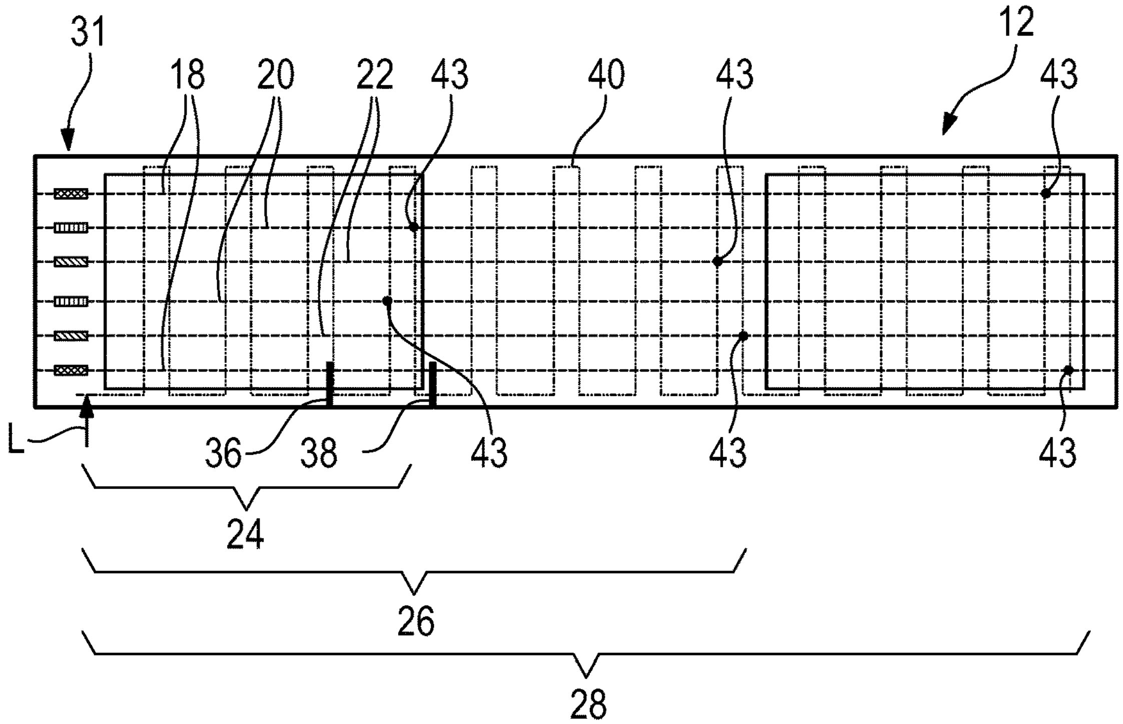
Figure 7:
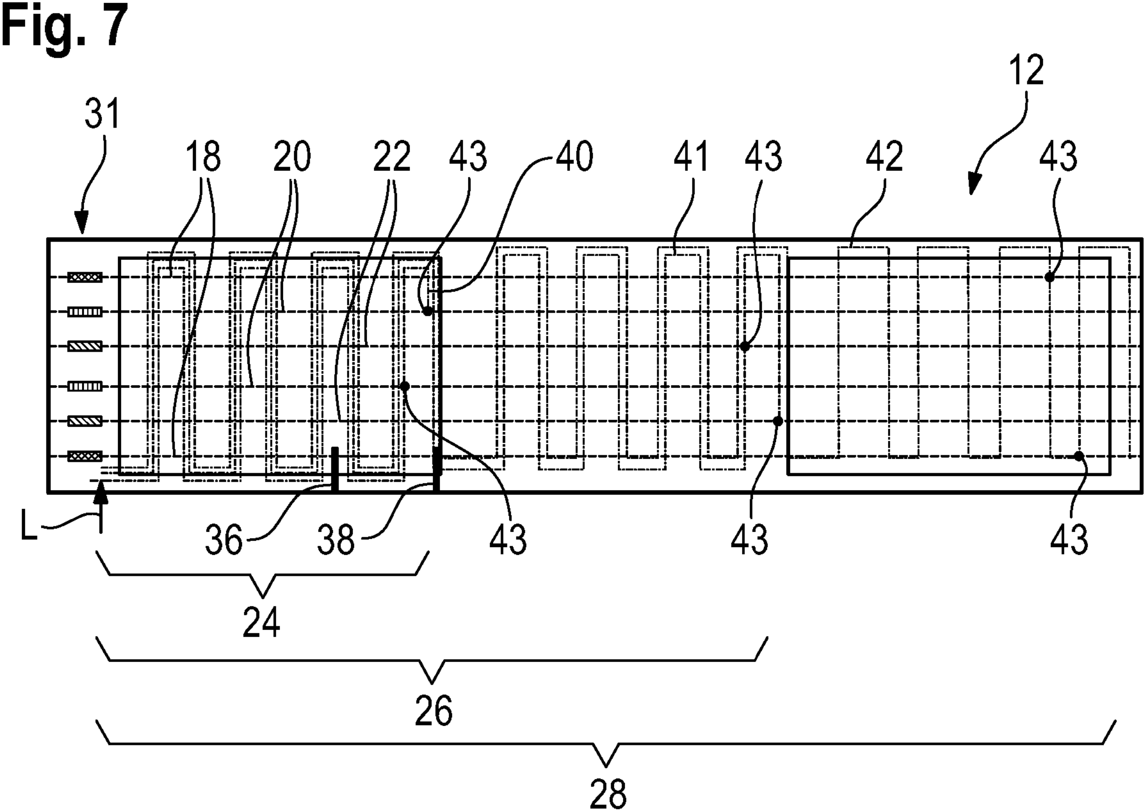
Figure 8:
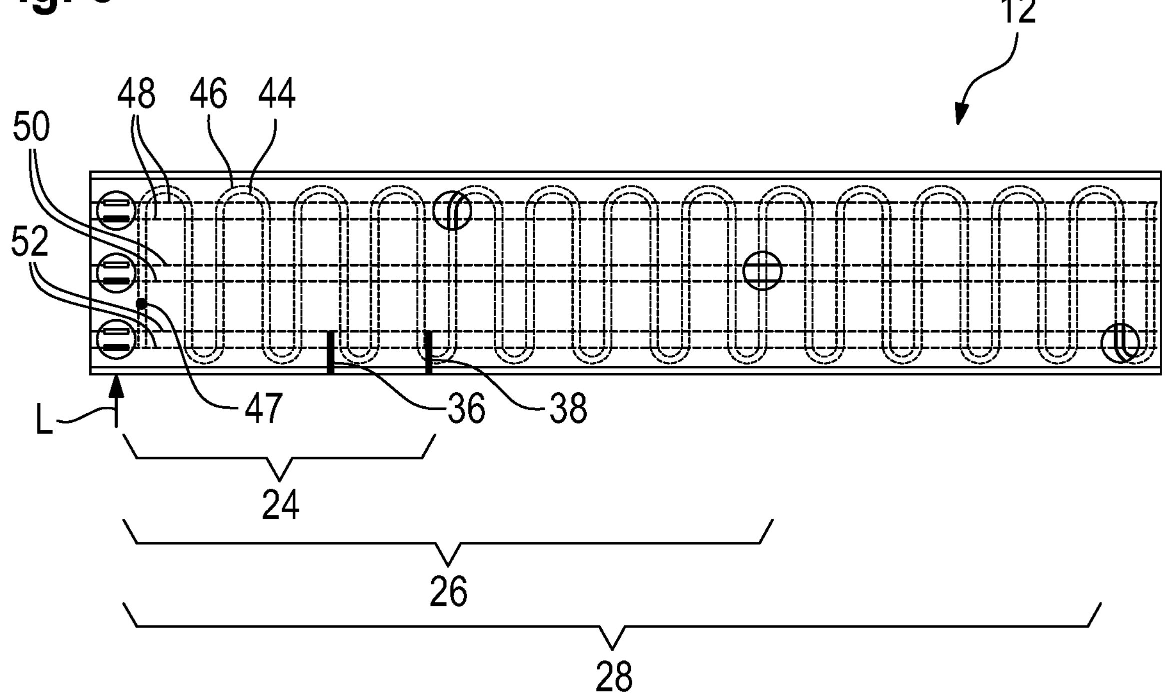
Figure 9:
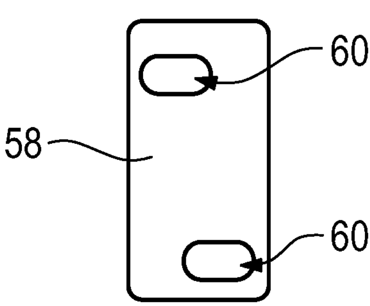
Figure 10:
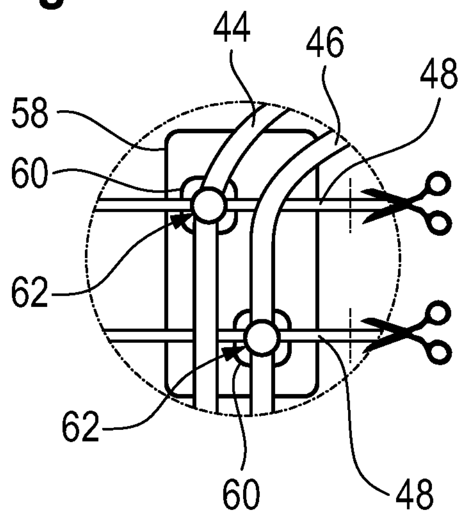
Figure 11:
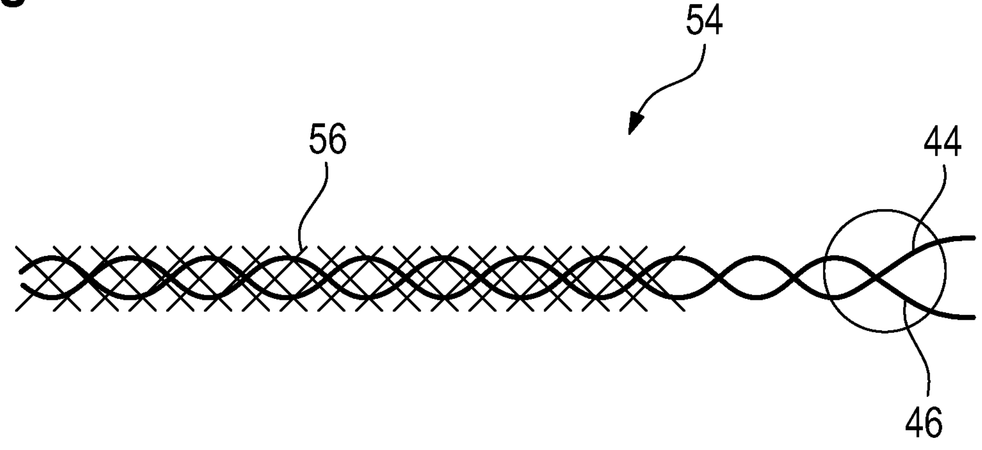
Figure 12:
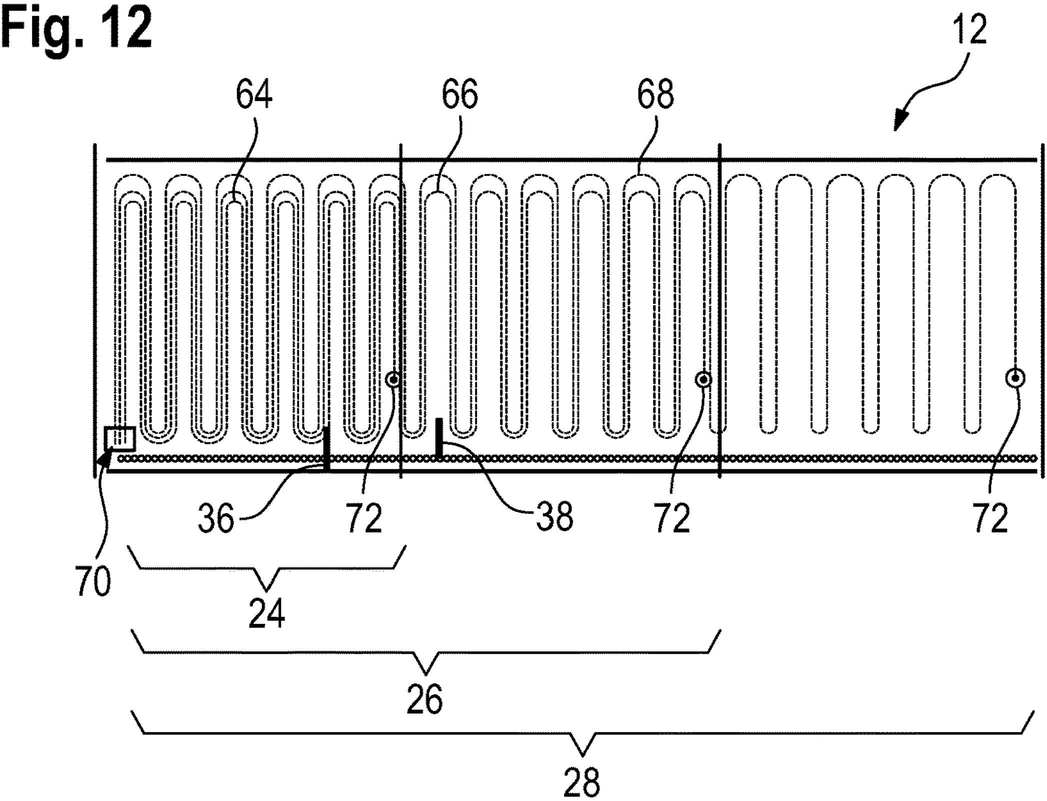
Figure 13:
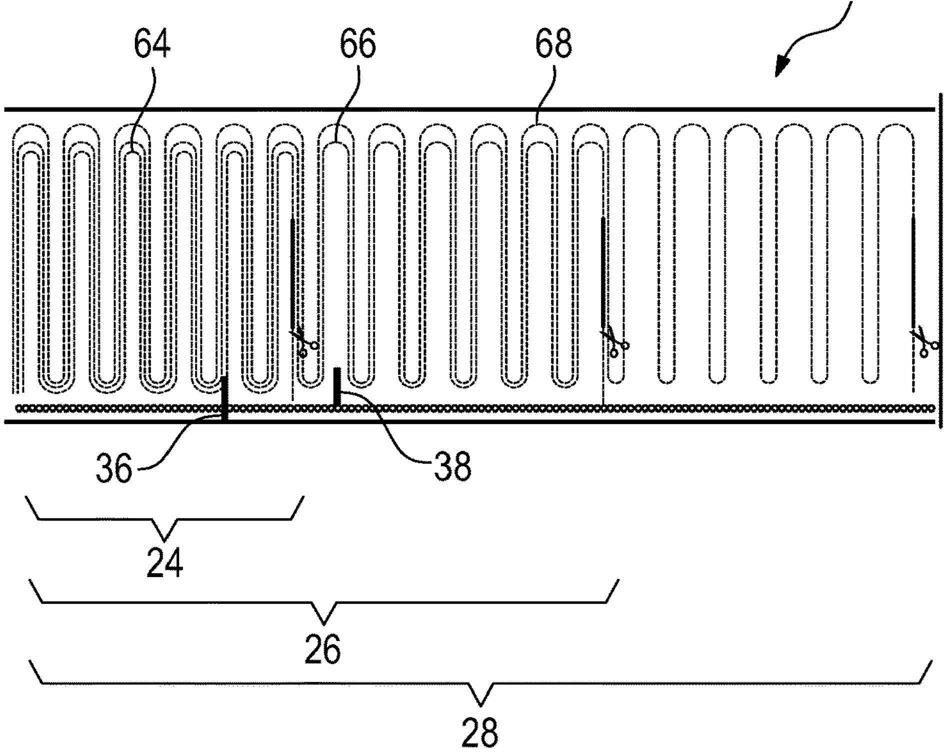

Further advantages and features of the invention will be evident from the following description and from the attached drawings, wherein:

FIG. 1 shows an intermediate product in manufacturing a webbing according to the invention, with heating conductors being incorporated into a webbing body as a warp thread, FIG. 2 shows a seatbelt system according to the invention comprising a webbing according to the invention, FIG. 3 shows a webbing according to the invention as set forth in a further embodiment, FIG. 4 shows a webbing according to the invention as set forth in a further embodiment, FIG. 5 shows another webbing according to the invention comprising an electric conductor in the warp and in the weft, FIG. 6 shows yet another webbing according to the invention comprising an electric conductor in the warp and in the weft, FIG. 7 shows another webbing according to the invention, FIG. 8 shows another webbing according to the invention, with a heating conductor being incorporated into the webbing as a weft thread, FIG. 9 shows a soldering pad for contacting the heating conductors, FIG. 10 shows a detail view in the area of contacting of the heating conductors, FIG. 11 shows a bipolar heating conductor, FIG. 12 shows a webbing according to the invention comprising a bipolar heating conductor according to FIG. 11, and FIG. 13 shows another webbing according to the invention comprising a bipolar heating conductor.

FIG. 1 schematically shows an intermediate product 10 when manufacturing a heatable webbing 12 for a seatbelt system 14 of an automotive vehicle which is illustrated in FIG. 2.

The intermediate product 10 comprises a woven webbing body 16 into which plural heating conductors 18, 20, 22 are woven as warp threads extending in the longitudinal direction.

The heating conductors 18, 20, 22 are sheathed by an insulation not shown for the sake of convenience.

The webbing body 16 can be manufactured as an endless body and can be cut to length for manufacturing plural heatable webbings 12.

The heating conductors 18, 20, 22 serve to heat the webbing 12.

The heating conductors 18, 20, 22 are woven into the webbing body 16 as endless threads for reasons of manufacture.

In order to allow for electric contacting of the heating conductors 18, 20, 22, the heating conductors 18, 20, 22 are guided, specifically floated, to the surface of the webbing 12 at plural points.

The positions where the heating conductors 18, 20, 22 are guided to the surface of the webbing 12 are selected such that plural heatable sections 24, 26, 28 can be formed each of which extends over different longitudinal portions of the webbing 12.

FIG. 2 schematically shows a seatbelt system 14 comprising a power source 30, specifically a voltage source, and comprising a heatable webbing 12. The heatable webbing 12 shown in FIG. 2 is manufactured specifically of the intermediate product 10 shown in FIG. 1.

Moreover, a control unit 32 is provided for controlling the heating conductors 18, 20, 22.

In the illustrated embodiment, the webbing 12 is exemplified to have three heatable sections 24, 26, 28, but there can also be provided only two or more than three heatable sections.

The heatable sections 24, 26, 28 are arranged to be overlapping in the longitudinal direction.

More precisely, the heatable sections 24, 26, 28 extend from an initial portion 31 of the webbing 12. Specifically, all heatable sections 24, 26, 28 start at the same longitudinal position L of the webbing 12.

The length of a first heatable section 24 is, for example, half the length of a second heatable section 26 and one third of the length of a third heatable section 28.

The third heatable section 28 extends over up to 95% of the length of the webbing 12, for example.

In the embodiment, four heating conductors 18, 20, 22 extending in parallel to each other are associated with each of the heatable sections 24, 26, 28.

The heating conductors 18, 20, 22 are guided to the surface at the beginning and at the end of each of the associated heatable sections 24, 26, 28.

One end of each of the heating conductors 18, 20, 22 is connected to the power source 30, in particular in the area of the longitudinal position L at which all heatable sections start.

Compared to the intermediate product 10 shown in FIG. 1, moreover two respective heating conductors 18, 20, 22 which are associated with the same heatable section 24, 26, 28 are electrically interconnected by an electric connector 34 so that an electric circuit is made if the heating conductors 18, 20, 22 are connected to the power source 30.

The electric connection of the heating conductors 18, 20, 22 to each other in this case is made on the surface of the webbing body 16.

The electric connecting elements 34 are wires, for example. The wires can also be cut off and the ends can be connected.

The electric contacting of the heating conductors 18, 20, 22 at the beginning and at the end of the associated heatable section 24, 26, 28 can be made by means of soldering, crimping, laser-welding or the like.

The heating conductors 18, 20, 22 are interconnected in each case at the end of the associated heatable section 24, 26, 28.

Hence, at least the heating conductors 18, 20 associated with the first and second heatable sections 24, 26 are not supplied with current over their entire length when the webbing 12 is heated. Therefore, it is also conceivable that the heating conductors 18, 20 are cut at the end of the associated heatable section 24, 26 so as to prevent current flow from exceeding the associated heatable section 24, 26.

When current flows through the heating conductors 18, 20, 22, the corresponding section 24, 26, 28 is heated.

During operation of the heatable webbing 12, only one of the heatable sections 24, 26, 28 at a time is heated by corresponding control of the heating conductors 18, 20, 22.

The contact points, viz. the points where the heating conductors 18, 20, 22 are guided to the surface can be coated, laminated or sealed, specifically covered by a plastic, textile or polymer material, so as to be protected from mechanical stress and environmental influences such as moisture, temperature and dust. This applies mutatis mutandis to the connecting elements 34.

The seatbelt system 14 additionally comprises a temperature sensor 36 which is integrated in the webbing 12 to measure a temperature of the webbing 12. Preferably, the temperature sensor 36 is integrated in the first heatable section 24.

The temperature sensor 36 is connected to the control unit 32. Based on the measured temperature, the control unit 32 can adjust a heat output.

Furthermore, there can be provided a motion sensor 38 which is arranged to detect how far the webbing 12 is extended. The control unit 32 can determine, based on the extended length of the webbing 12, which of the heatable sections 24, 26, 28 is intended to be heated.

The motion sensor 38 can be integrated in the webbing 12, as illustrated in FIG. 2. However, the motion sensor 38 can also be constituted by an optical system which is disposed outside the webbing 12 and senses a height and/or seating position of a vehicle occupant.

FIG. 3 schematically illustrates a webbing 12 which can equally be made of the intermediate product 10 shown in FIG. 1.

The webbing 12 shown in FIG. 3 differs from the webbing 12 shown in FIG. 2 by the fact that all four heating conductors 18, 20, 22 of a heatable section 24, 26, 28 in each case are interconnected in parallel.

FIG. 4 schematically illustrates another webbing 12 that is configured similarly to the webbings 12 shown in FIGS. 2 and 3, but differs by the order of the heating conductors 18, 20, 22.

FIG. 5 schematically illustrates another webbing 12. The webbing 12 shown in FIG. 5 differs from the webbings 12 illustrated in FIGS. 2 to 4 by the electric connection of the heating conductors 18, 20, 22.

According to the webbing 12 illustrated in FIG. 5, each of the heating conductors 18, 20, 22 is guided to the surface of the webbing 12 only at the beginning of the associated heatable section 24, 26, 28 so as to allow for a connection to the power source 30.

At the end of a heatable section 24, 26, 28, the heating conductors 18, 20, 22 associated with the corresponding heatable section 24, 26, 28 are connected by an electric conductor 40 which is incorporated in the webbing body 16 as a weft thread.

For example, the electric conductor 40 is an electrically conducting wire or an electrically conducting yarn.

The electric conductor 40 is sheathed with an insulation not shown for the sake of convenience.

The electric connection between the heating conductors 18, 20, 22 and the electric conductor 40 can be established by a contactless connecting technique such as infrared soldering.

The insulation is preferably removed at the contact points 43 between the heating conductor 18, 20, 22 and the electric conductor 40 so as to facilitate an electric connection.

The contact points 43 can also be coated or covered to protect them from mechanical stress, as already described in connection with FIG. 2.

According to the embodiment illustrated in FIG. 5, an electric conductor 40 is guided in each weft thread.

According to the embodiment shown in FIG. 6 which schematically illustrates another webbing 12, in contrast to FIG. 5, an electric conductor 40 is not integrated in each weft thread but the electric conductor 40 is arranged in intervals. That is, plural weft threads without an electric conductor 40 extend between the weft threads which include an electric conductor 40. This is possible with the aid of a special loom.

FIG. 7 schematically illustrates a webbing 12 in which the electric connection of the heating conductors 18, 20, 22 is equally established by electric conductors guided in the weft thread.

In contrast to the embodiments shown in FIGS. 5 and 6, plural electric conductors 40, 41, 42 are provided which extend, starting from the longitudinal position L, in parallel to each other particularly in the first heatable section 24.

A first electric conductor 40 connects the heating conductors 18 associated with the first heatable section 24 and ends at the end of the first heatable section 24.

In the same way, a second and, resp., third electric conductor 41, 42 connects the heating conductors 20, 22 associated with the second and, resp., third heatable section 26, 28 and ends at the end of the second and, resp., third heatable section 26, 28.

The webbing fabric is formed by another weft thread, as the electric conductors are inserted in intervals only, which is possible by a special loom.

As an alternative, the electric conductors 40, 41, 42 can extend to the end of the webbing 12, i.e., the electric conductors 40, 41, 42 do not end at the end of the respective heatable section 24, 26, 28. The electric conductors 40, 41, 42 then should be separated after the contacting point so as to disconnect the current flow.

FIG. 8 schematically illustrates another webbing 12.

In contrast to the webbings 12 illustrated in the FIGS. 2 to 7, in the webbing 12 illustrated in FIG. 8 the heating conductors are woven into the webbing body 16 as weft threads rather than as warp threads.

For example, two heating conductors 44, 46 extend along the webbing 12 in parallel to each other in the weft.

In particular, the heating conductors 44, 46 meander within the webbing 12. This can be performed by a special loom. The fabric is formed by means of another weft thread and the heating conductors 44, 46 are inserted in intervals only.

The heating conductors 44, 46 are electrically insulated from each other over the major part of their length. Merely in the initial area of the webbing 12, the two heating conductors 44, 46 are directly electrically interconnected, specifically via a soldering point 47.

In addition, plural electric conductors 48, 50, 52 are woven into the webbing 12 as warp threads. The electric conductors 48, 50, 52 consequently extend in parallel to each other.

In particular, two electric conductors 48, 50, 52 extending in parallel to each other are associated with each heatable section 24, 26, 28, one of the two electric conductors 48, 50, 52 being electrically connected at the end of the respective heatable section 24, 26, 28 to the first heating conductor 44 and the other of the two electric conductors 48, 50, 52 being electrically connected to the second heating conductor 46.

The electric conductors 48, 50, 52 thus serve for establishing a closed circuit so that the webbing 12 can be heated by supplying current to the heating conductors 44, 46.

The electric conductors 48, 50, 52 can be connected to the power source 30 for this purpose.

In order to facilitate contacting of the electric conductors 48, 50, 52 in the initial area of the webbing 12, the electric conductors 48, 50, 52 are guided, specifically floated, to the surface of the webbing 12 in this area.

Moreover, both the electric conductors 48, 50, 52 and the heating conductors 44, 46 are guided to the surface of the webbing 12 at the end of each heatable section 24, 26, 28 so as to facilitate contacting.

In a bipolar heating conductor 54, the two heating conductors 44, 46 can be guided in a joint sheath 56 being electrically insulated from each other. The sheath 56 is removed only at the contact points with the electric conductors 48, 50, 52 and for connection of the heating conductors 44, 46 to each other in the initial area of the webbing 12.

FIGS. 9 and 10 illustrate a possible connection between the electric conductors 48, 50, 52 and the heating conductors 44, 46.

FIG. 9 particularly shows a circuit board 58 comprising soldering pads 60.

As illustrated in FIG. 10, the heating conductors 44, 46 are soldered with the electric conductors 48, 50, 52 on the soldering pads 60.

Subsequently, the soldering points 62 can be covered by a protective film such as a polyamide film.

In order to prevent current flow beyond the heatable section 24, 26, 28 during activation of a heatable section 24, 26, 28, each of the electric conductors 48, 50, 52 is cut at the end of the associated heatable section 24, 26, 28, as illustrated in FIG. 10.

FIG. 12 schematically shows another belt webbing 12, with plural heating conductors 64, 66, 68 being incorporated into the webbing body 16 as weft threads.

The heating conductors 64, 66, 68 illustrated in FIG. 12 constitute a bipolar heating conductor as illustrated in FIG. 11.

A bipolar heating conductor 64, 66, 68 is associated with each heatable section 24, 26, 28.

In an alternative embodiment which is not shown for the sake of convenience, two separate individual heating conductors may be provided in each heatable section 24, 26, 28.

In the illustrated embodiment, each of the heating conductors 64, 66, 68 ends at the end of the associated heatable section 24, 26, 28 to prevent current flow beyond the respectively activated heatable section 24, 26, 28. For forming the fabric a second weft thread is endlessly inserted.

As an alternative, the heating conductors 64, 66, 68 may extend over the entire webbing 12 and may be cut at the end of each associated heatable section 24, 26, 28. This option is easier to implement in terms of manufacture.

In order to establish a circuit, at the beginning of the heatable sections 24, 26, 28 each heating conductor 64, 66, 68 has a connector 70 adapted to be connected to the power source 30.

At the end of the heatable sections 24, 26, 28, the heating conductors 64, 66, 68 which are associated with the same heatable section 24, 26, 28 are electrically interconnected.

For this purpose, each of the bipolar heating conductors 64, 66, 68 is isolated and insulated at the beginning and at the end of the associated heatable section 24, 26, 28.

According to the embodiment schematically illustrated in FIG. 12, the heating conductors 64, 66, 68 are electrically interconnected in a contact point 72 at the end of the associated heatable section 24, 26, 28 by a contactless connecting technique such as infrared soldering.

FIG. 13 schematically shows another webbing 12. The webbing 12 illustrated in FIG. 13 differs from the webbing 12 shown in FIG. 12 by the way in which the individual conductors of the bipolar heating conductors 64, 66, 68 are electrically interconnected at the end of the heatable sections 24, 26, 28.

In particular, at the end of the respective associated heatable section 24, 26, 28 the heating conductors 64, 66, 68 are guided, specifically floated, to the surface of the webbing 12 and are electrically interconnected there, for example by soldering, crimping, etc.

All webbings 12 which are illustrated in the FIGS. 3 to 8, 12 and 13 can be used in the seatbelt system 14 shown in FIG. 2.

The invention claimed is:

1. A heatable belt webbing for a seatbelt system of an automotive vehicle, wherein the webbing comprises plural heatable sections extending over respective different longitudinal portions of the webbing, wherein at least one heating conductor is associated with each heatable section in such a manner that the heatable sections can be heated separately from each other by appropriate activation of the individual heat conductors, all the heating conductors extending through all of the heatable sections, wherein the webbing has a woven webbing body which includes warp threads extending in the longitudinal direction and weft threads extending transversely to the warp threads, the heating conductors being woven into the webbing body as a warp thread, and in that the heating conductors associated with a heatable section are guided to a surface of the webbing at the beginning and/or at the end of each heatable section.

2. The webbing according to claim 1, wherein at least two heating conductors extending in parallel to each other are associated with each heatable section.

3. The webbing according to claim 1, wherein the heatable sections are arranged to overlap in the longitudinal direction.

4. The webbing according to claim 1, wherein all heatable sections extend from an initial portion of the webbing and all heatable sections start at the same longitudinal position (L) of the webbing.

5. The webbing according to claim 1, wherein the heating conductors associated with the same heatable section are electrically interconnected.

6. The webbing according to claim 1, wherein the heating conductors are woven into the webbing body as warp threads and the heating conductors are electrically interconnected by means of electrically conducting weft threads to close a circuit.

7. The webbing according to claim 1, wherein the heating conductor is formed by a bipolar conductor having two individual conductors insulated from each other, wherein the individual conductors are electrically interconnected in an end portion of the heating conductor.

8. The webbing according to claim 1, wherein a temperature sensor is integrated in the webbing.

9. A seatbelt system for an automotive vehicle comprising a heatable webbing according to claim 1 and a power source which is connected to the heating conductors.

10. The webbing according to claim 1, wherein all the heating conductors are connected to power at the same longitudinal location on the webbing.

11. The webbing according to claim 1, wherein the heating conductors associated with a heatable section are only guided to a surface of the webbing at the beginning and/or at the end of each heatable section.

12. The webbing according to claim 4, wherein a first heatable section has a first length along the webbing and a second heatable section has a second length along the webbing longer than the first length.

13. A heatable belt webbing for a seatbelt system of an automotive vehicle, wherein the webbing comprises plural heatable sections extending over respective different longitudinal portions of the webbing, wherein at least one heating conductor is associated with each heatable section in such a manner that the heatable sections can be heated separately from each other by appropriate activation of the individual heat conductors, wherein the webbing has a woven webbing body which includes warp threads extending in the longitudinal direction and weft threads extending transversely to the warp threads, the heating conductors being woven into the webbing body as a warp thread, and in that the heating conductors associated with a heatable section are guided to a surface of the webbing at the beginning and/or at the end of each heatable section, wherein first heating conductors heat a first heatable section and second heating conductors heat a second heatable section, the first and second heating conductors extending through the first and second heatable sections.

14. The webbing according to claim 1, wherein the first and second heating conductors are connectable to a power source at the same longitudinal position along the webbing.

15. The webbing according to claim 13, wherein the first and second heatable sections overlap in the longitudinal direction.

16. The webbing according to claim 13, wherein the first and second heatable sections extend from an initial portion of the webbing and start at the same longitudinal position of the webbing.

17. The webbing according to claim 16, wherein the first heatable section has a first length along the webbing and the second heatable section has a second length along the webbing longer than the first length.

18. The webbing according to claim 13, wherein the first heating conductors are electrically interconnected and the second heating conductors are electrically interconnected.

19. The webbing according to claim 13, wherein the first heating conductors are woven into the webbing body as warp threads and the first heating conductors are electrically interconnected by means of electrically conducting weft threads to close a circuit, the second heating conductors being woven into the webbing body as warp threads and the second heating conductors being electrically interconnected by means of electrically conducting weft threads to close a circuit.

20. The webbing according to claim 13, wherein the first heating conductors are only guided to a surface of the webbing at the beginning and/or at the end of the first heatable section and the second heating conductors are only guided to a surface of the webbing at the beginning and/or at the end of the second heatable section.

* * * * *